United States Patent [19]

Sheridan et al.

[11] Patent Number: 4,599,908

[45] Date of Patent: Jul. 15, 1986

[54] OPTO-MECHANICAL TOUCH SENSOR

[76] Inventors: Thomas B. Sheridan, 32 Sewall St., West Newton, Mass. 02165; John L. Schneiter, 1 Lisa La., North Reading, Mass. 01864

[21] Appl. No.: 712,651

[22] Filed: Mar. 18, 1985

[51] Int. Cl.$^4$ .......................... G01L 5/16; G01D 5/32
[52] U.S. Cl. ................. 73/862.04; 250/227; 250/231 R; 901/47
[58] Field of Search ................ 73/800, 172, 432 T, 73/705, 862.04; 250/227, 229, 231 R, 231 P; 340/365 P, 365 A; 901/33, 47; 350/96.15

[56] References Cited

U.S. PATENT DOCUMENTS

| | | | |
|---|---|---|---|
| 3,503,116 | 3/1970 | Strack | 73/705 X |
| 4,306,148 | 12/1981 | Ringwall et al. | 73/862.04 X |
| 4,405,197 | 9/1983 | Bejczy | 73/432 T X |
| 4,547,668 | 10/1985 | Tsikos | 73/705 X |

OTHER PUBLICATIONS

L. L. Johnson et al., "Optical Keyboard", IBM Tech. Disc. Bull., vol. 20., No. 9, Feb. 1978, pp. 3612-3613.
J. L. Schneiter et al., "An Optical Tactile Sensor for Manipulators", Robotics & Computer-Integrated Mnfg., vol. 1, No. 1, 1984, pp. 65-71.
J. L. Schneiter, "An Optical Tactile Sensor for Robots", M.I.T. Thesis, 1982.

*Primary Examiner*—Charles A. Ruehl
*Attorney, Agent, or Firm*—Zalkind & Shuster

[57] ABSTRACT

A pressure deformable body of a transducer is formed with a plurality of passage holes through which paths are established for a signal medium conducted thereto through a rigid base on which the body is mounted. Portions of the body material when loaded bulge into the passage holes causing constriction thereof to vary the intensity of the signal medium transmitted. The passage holes are spaced in an array arranged to distribute hole constriction in a load-pattern reproducing manner.

16 Claims, 6 Drawing Figures

OPTO-MECHANICAL TOUCH SENSOR

BACKGROUND OF THE INVENTION

This invention relates to pressure transducers in general and in particular to a tactile sensor from which information regarding the magnitude and pattern of pressure forces being sensed is transmitted by a signal medium for processing and analysis.

Pressure transducers having a flexible, pressure deformable reflector from which light radiation is reflected, is already well known as disclosed, for example, in U.S. Pat. No. 3,580,082 and in a technical paper authored by the applicants entitled "An Optical Tactile Sensor For Manipulators", published in 1984 in "Robotics & Computer-Integrated Manufacturing", Vol. 1, No. 1, pp. 65-71. In the foregoing type of transducer, a fiber bundle conducts light to and from a rigid base in which the optical fiber ends are embedded in spaced relation to each other. Light emerging from the fiber ends travels a short distance through a light transmitting medium to impinge on the flexible reflector and is reflected therefrom to reenter the fiber ends of the fiber bundle. The intensity of the reflected light reentering the fiber bundle depends on the variable reflection angles on the flexible reflector as a measure of its displacement under pressure loading. The light transmitting medium spacing the sensor base from the flexible reflector may be a transparent elastomer body through which the reflected light travels along paths determined by the reflection angles on the flexible reflector to vary the intensity of the reflected light as a function of pressure loading on the transducer.

The foregoing type of pressure transducer has not performed satisfactorily because of two major problems. First, the intensity of the reflected light output from the transducer is so small as to be overwhelmed by the glare produced during pick-up by a receiver, such as a video camera, as the light passes through a beam splitter. Second, the sensitivity of the transducer to pressure changes was found to be too low for detection as a computer input.

Accordingly, an important object of the present invention is to provide a pressure transducer through which passage of a signal medium is varied as a function of loading with improved sensitivity to changes in loading and to provide an output at a level that is more readily detectable.

SUMMARY OF THE INVENTION

In accordance with the present invention, the pressure transducer has a pressure deformable body spacing the flexible reflective layer from the rigid base and is made of a material that is opaque so as to block any transmission of light radiation therethrough. Light is accordingly conducted only through passage holes formed in the body in alignment with the fiber ends of the light trasmitting optical fiber bundle embedded in the rigid base. Light from the fiber ends will therefore travel along paths established by such holes and be reflected from the flexible layer through the holes to reenter the fiber ends. The flexible layer acts as a light diffusing reflector so that the intensity of the reflected light reentering the fiber ends will depend primarily on the dimensions of the passage holes, which are variably constricted cross-sectionally under pressure loading of the deformable body through the flexible layer.

The body material, such as a soft black rubber, is internall non-compressible so that volumetric portions thereof, displaced by pressure loading at the surface supporting the flexible reflective layer, bulges into adjacent passage holes to effect said constriction of the holes. The holes are hence constricted to varying degrees between a total closing condition under maximum detectable pressure loading and a fully open condition under zero loading. Further, the passage holes are equally spaced from each other in a hexagonal pattern, for example, so as to volumetrically distribute the pressure displaced portions of the body amongst adjacent passage holes in a pressure-pattern reproducing fashion.

BRIEF DESCRIPTION OF DRAWING FIGURES

DETAILED DESCRIPTION OF THE PREFERRED EMBODIMENT

Figure 1:
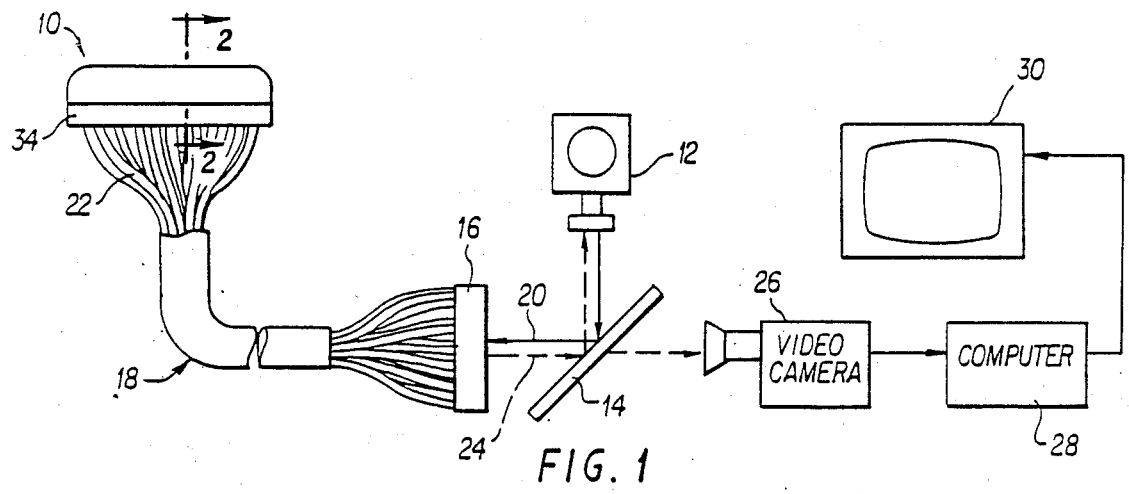
FIG. 1 is a simplified schematic illustration of a typical signal processing installation with which a pressure transducer of the present invention may be associated.

Referring now to the drawings in detail, FIG. 1 schematically illustrates a typical installation of a pressure transducer 10 constructed in accordance with one embodiment of the present invention, such installation being generally known and forming no part of the specific contribution of the present invention, particularly since other sensor installations are contemplated and embraced by the present invention. In the installation shown, a signal medium in the form of visible light radiation is generated by a lamp source 12 and directed along an optical beam path impinging on a beam splitter 14. The light is partially reflected by the beam splitter toward the receiver end portion 16 of a coherent fiber bundle generally referred to by reference numeral 18. The light transmitted to the fiber bundle as indicated by solid arrows 20 in FIG. 1, emerges from the diverging conical end portion 22 of the fiber bundle and enters the sensor 10 from which the light is reflected and returns through the fiber bundle. The reflected light exits from the receiver end 16 of the fiber bundle as indicated by dotted arrows 24 to partially pass through the beam splitter 14 toward a video camera 26. The output of the video camera is digitized and processed by computer facilities 28 having a display 30 associated therewith. The intensity of the light and the intensity light pattern received by the video camera is a function of the tactile load or pressures sensed by transducer 10. Such loading of the transducer may be analyzed by the computer to provide information and control signals for various purposes such as robotic control as is already known in the art.

Figure 2:
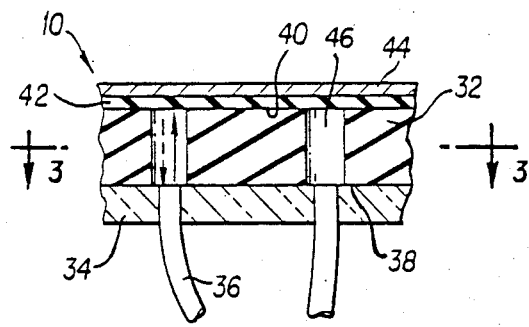
FIG. 2 is an enlarged partial section view taken substantially through a plane indicated by section line 2—2 in FIG. 1 showing the transducer construction in accordance with one embodiment of the present invention.

As more clearly seen in FIG. 2, the transducer 10 includes a flexible elastomer body 32 mounted on a relatively rigid base 34 made of plexiglass, for example, within which the ends of the optical fibers 36 of the fiber bundle 18 are embedded in relatively close spaced relation to each other. In the illustrated embodiment, a relatively fixed interface plane 38 is established between the base 34 and body 32 in parallel spaced relation to an opposite face 40 of the body 32 in its undeformed state as shown in FIG. 2. A flexible reflective layer 42 is cemented or otherwise secured to the face 40 of body 32 and may be coated with an outer opaque protective coating 44.

Figure 3:
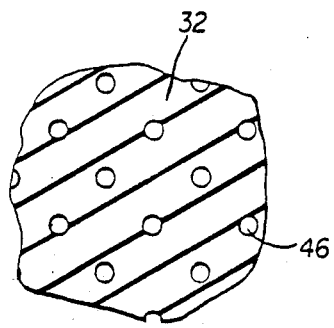
FIG. 3 is a further enlarged partial section view taken substantially through a plane indicated by section line 3—3 in FIG. 2.

In accordance with the present invention, the body 32 is made of an opaque material such as a soft black rubber which is relatively incompressible although deformable under pressure and which blocks transmission of light therethrough except for a plurality of paths established by passage holes 46 formed in the body. In the undeformed state of the body 32, the passage holes 46 are of uniform circular cross-section and constant diameter. The ends of the passage holes are furthermore aligned with the ends of the optical fibers 36 embedded in the base at the interface surface 38. In accordance with one embodiment as shown in FIG. 3, adjacent passage holes 46 are equally spaced from each other to form a hexagonal pattern or array. Other passage hole arrays may also be suitable, such as rectangular pattern. Because of the opaque property of the body 32, the passage of transmitted and reflected light in opposite directions as indicated by the solid and dotted arrows 20 and 24 is confined to the paths formed by the holes 46.

Figure 4:
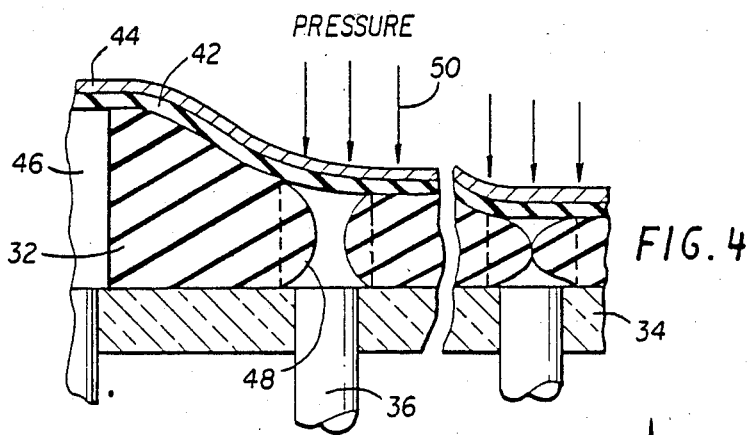
FIG. 4 is a further enlarged partial section view similar to that of FIG. 2 showing the transducer in a pressure loaded state.

Because of the incompressibility property of the body 32, when its face 40 is displaced under pressure relative to the base-fixed surface 38 as shown in FIG. 4, volumetrically displaced portions 48 of the body will bulge into and occupy adjacent passage holes that are otherwise of uniform diameter in the undeformed state of the body. Thus, the passage holes 46 will be constricted to varying degrees and in patterns corresponding to the magnitude and pattern of localized pressure forces 50 applied to surface 40 of the body through flexible layer 42, as shown in FIG. 4. Constriction of the holes to a total closing condition and the corresponding maximum pressure forces capable of being sensed, is depicted at the right hand end portion of FIG. 4 by way of example. By virtue of such passage hole constrictions, the intensity of the light passing through the holes in the body will be varied as a function of the body deformation under pressure loading.

The flexible layer 42 is made of a deformable, light reflective and diffusing material such as a white colored, silicone rubber made by Dow Corning. Thus, the intensity of the reflected light 24 conducted through each of the passage holes 46 will primarily depend on the constriction of the hole which is in turn related to localized body width as a measure of hole constriction.

Figure 5:
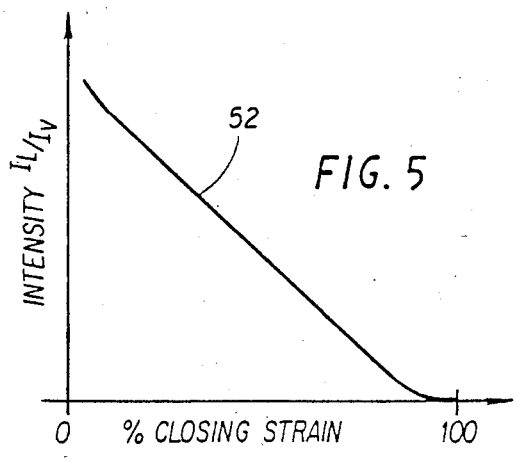
FIG. 5 is a graphical illustration depicting certain operational characteristics of the transducer shown in FIGS. 1-4.

The output response of the foregoing sensor arrangement was found in practice to approximate a substantially linear function as depicted by curve 52 in FIG. 5 representing the change in output light intensity vs. body deformation in terms of percent of hole closing strain. Further, a larger pressure sensitivity range was found to be applicable to the sensor arrangement hereinbefore described as compared to the prior art. For example, a change in pressure as low as approximately 2.3 psi is detectable by the sensor. It is also contemplated that sensitivity to compressive pressure forces may be increased within limits by an increase in the thickness to passage hole diameter ratio of the body 32 and that a sufficient increase in body thickness could render the transducer 10 effective as a shear sensor.

Figure 6:
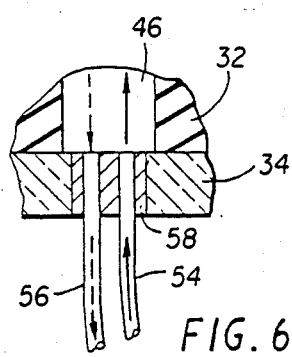
FIG. 6 is a partial section view showing a portion of another embodiment of the transducer.

As hereinbefore described, each fiber 36, made of an optical plastic material, is designed to conduct light 20 and 24 in opposite directions. As an alternative, each fiber 36 could be replaced by a pair of smaller glass fibers 54 and 56 respectively conducting light 20 and 24 in opposite directions as shown in FIG. 6. In such case, each passage hole 46 is aligned with an epoxy plug 58 within which the ends of fibers 54 and 56 are embedded.

What is claimed is:

1. In a sensor including a body having at least two surfaces spaced from each other by a predetermined amount in an undeformed state, a base abutting one of the surfaces with respect to which the other of the surfaces undergoes localized relative displacement and means mounted in the base for transmitting a signal medium through the body between said surfaces thereof with an intensity varied by said displacement of the other of the surfaces, the improvement comprising passage means in the body, having ends at said one of the surfaces through which the signal medium passes, for transmission of the signal medium along a plurality of predetermined paths within the body, said body being made of a deformable material which limits said transmission of the signal medium to said paths and dimensionally varies said passage means in response to said displacement of the other of the surfaces to correspondingly vary the intensity of the transmitted signal medium.

2. The improvement as defined in claim 1 including flexible means mounted on said other of the surfaces of the body for blocking the passage means to terminate said paths established in the body.

3. The improvement as defined in claim 2 wherein said signal medium is radiation that is diffusingly reflected by said flexible means.

4. The sensor as defined in claim 3 wherein said base mounted means for transmitting the signal medium comprises an optical fiber bundle through which the radiation is conducted in opposite directions.

5. The improvement as defined in claim 4 wherein said passage means comprises a plurality of spaced holes extending from the ends through the body along said predetermined paths, said deformable material causing constriction of the holes as a function of said displacement of said other of the surfaces of the body.

6. The improvement as defined in claim 5 wherein each of said passage holes is cross-sectionally varied in dimension between a fully open condition in the undeformed state of the body and a totally closed condition under maximum displacement of said other of the surfaces of the body.

7. The improvement as defined in claim 1 wherein said passage means comprises a plurality of spaced holes extending from the ends through the body along said predetermined paths, said deformable material causing constriction of the holes as a function of said displacement of said other of the surfaces of the body.

8. The improvement as defined in claim 7 wherein each of said passage holes is cross-sectionally varied in dimension between a fully open condition in the undeformed state of the body and a totally closed condition under maximum displacement of said other of the surfaces of the body.

9. The improvement as defined in claim 8 including flexible means mounted on said other of the surfaces through which the body is deformed for diffusingly reflecting the signal medium through the passage holes.

10. In a pressure transducer having a deformable body with parallel spaced surfaces, a rigid base abutting one of the surfaces, a flexible reflective layer mounted on the other of the surfaces and optical fiber means mounted in the base through which radiation is transmitted in opposite directions, the improvement comprising a plurality of spaced passage holes formed in the body having opposite ends at said parallel spaced surfaces of the body, the ends at said one of the surfaces being aligned with the optical fiber means, said body being made of an opaque material causing constriction of the passage holes in response to deformation of the body through the flexible layer at said other of the surfaces thereof to vary the intensity of the radiation reflected from said flexible layer and transmitted in one of the opposite directions through the optical fiber means from the passage holes.

11. The improvement as defined in claim 10 wherein said passage holes are equally spaced from each other in a hexagonal pattern.

12. The improvement as defined in claim 10 wherein said optical fiber means includes mounting plugs fixed to the base in alignment with said ends of the passage holes at said one of the surfaces, and a pair of fibers embedded in each of the mounting plugs through which the radiation is transmitted in said opposite directions, respectively.

13. The improvement as defined in claim 10 wherein said deformable body is substantially incompressible and said flexible reflective layer is a light diffuser.

14. The improvement as defined in claim 10 wherein each of said passage holes is cross-sectionally varied in dimension between a fully open condition in the undeformed state of the body and a totally closed condition under maximum displacement of said other of the surfaces of the body.

15. In a pressure transducer including a body having at least two surfaces spaced from each other by a predetermined amount in an undeformed state, a base abutting one of the surfaces with respect to which the other of the surfaces undergoes localized relative displacement in response to pressure and means mounted in the base for transmitting a signal medium through the body between said surfaces thereof with an intensity varied by said displacement of the other of the surfaces, the improvement comprising a plurality of passage holes formed in the body in alignment with said signal medium transmitting means at said one of the surfaces of the body, said body being made of a material limiting transmission of the signal medium to paths established through said passage holes and causing constriction of the passage holes in response to said displacement of the other of the surfaces to restrict said transmission of the signal medium along said paths.

16. The improvement as defined in claim 15 including flexible means mounted on said other of the surfaces of the body for reflectively diffusing the signal medium through said passage holes to vary the intensity thereof as a function of the contriction of the holes.

* * * * *